US008520079B2

(12) United States Patent
Schultz et al.

(10) Patent No.: US 8,520,079 B2
(45) Date of Patent: Aug. 27, 2013

(54) EVENT MULTIPLEXER FOR MANAGING THE CAPTURE OF IMAGES

(75) Inventors: Stephen Schultz, West Henrietta, NY (US); Frank Giuffrida, Honeoye Falls, NY (US); Matt Kusak, Rochester, NY (US)

(73) Assignee: Pictometry International Corp., Rochester, NY (US)

( * ) Notice: Subject to any disclaimer, the term of this patent is extended or adjusted under 35 U.S.C. 154(b) by 962 days.

(21) Appl. No.: 12/031,576

(22) Filed: Feb. 14, 2008

(65) Prior Publication Data
US 2008/0204570 A1 Aug. 28, 2008

Related U.S. Application Data

(60) Provisional application No. 60/901,444, filed on Feb. 15, 2007.

(51) Int. Cl.
H04N 5/225 (2006.01)
H04N 9/04 (2006.01)
(52) U.S. Cl.
USPC ............ 348/207.99; 348/36; 348/37; 348/38
(58) Field of Classification Search
USPC ................................... 348/207.99
See application file for complete search history.

(56) References Cited

U.S. PATENT DOCUMENTS

| | | |
|---|---|---|
| 2,273,876 A | 2/1942 | Lutz et al. |
| 3,153,784 A | 10/1964 | Petrides et al. |
| 3,594,556 A | 7/1971 | Edwards |
| 3,614,410 A | 10/1971 | Bailey |
| 3,621,326 A | 11/1971 | Hobrough |

(Continued)

FOREIGN PATENT DOCUMENTS

| | | |
|---|---|---|
| AT | 331204 T | 7/2006 |
| AU | 9783798 | 4/1999 |

(Continued)

OTHER PUBLICATIONS

Ackermann, Prospects of Kinematic GPS Aerial Triangulation, ITC Journal, 1992.

(Continued)

*Primary Examiner* — Anthony J Daniels
(74) *Attorney, Agent, or Firm* — Dunlap Codding, P.C.

(57) ABSTRACT

An image capture system for capturing images of an object, such as the Earth. The image capture system includes a moving platform, at least two image capture devices, a position system, an event multiplexer and a computer system. The image capture devices are mounted to the moving platform. Each image capture device has a sensor for capturing an image and an event channel providing an event signal indicating the capturing of an image by the sensor. The position system records data indicative of a position as a function of time related to the moving platform. The event multiplexer has at least two image capture inputs and at least one output port. Each image capture input receives event signals from the event channel of one of the image capture devices. The event multiplexer outputs information indicative of an order of events indicated by the event signals, and identification of image capture devices providing the event signals. The computer system receives and stores the information indicative of the order of events indicated by the event signals, and identification of image capture devices providing the event signals.

11 Claims, 6 Drawing Sheets

(56) References Cited

U.S. PATENT DOCUMENTS

| | | |
|---|---|---|
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 * | 4/2001 | Matsumura et al. .......... 348/113 |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,142,984 B2 | 11/2006 | Rahmes et al. |
| 7,233,691 B2 | 6/2007 | Setterholm |
| 7,262,790 B2 | 8/2007 | Bakewell |
| 7,348,895 B2 | 3/2008 | Lagassey |
| 8,078,396 B2 | 12/2011 | Meadow et al. |
| 2002/0041328 A1 | 4/2002 | LeCompte et al. |
| 2002/0041717 A1 | 4/2002 | Murata et al. |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0088362 A1 | 5/2003 | Melero et al. |
| 2003/0214585 A1 | 11/2003 | Bakewell |
| 2004/0105090 A1 * | 6/2004 | Schultz et al. ............. 356/141.5 |
| 2004/0167709 A1 * | 8/2004 | Smitherman et al. ......... 701/208 |
| 2005/0073241 A1 | 4/2005 | Yamauchi et al. |
| 2005/0088251 A1 | 4/2005 | Matsumoto |
| 2005/0169521 A1 | 8/2005 | Hel-Or |
| 2006/0028550 A1 | 2/2006 | Palmer et al. |
| 2006/0092043 A1 | 5/2006 | Lagassey |
| 2006/0195876 A1 * | 8/2006 | Takahashi et al. ............... 725/19 |
| 2006/0238383 A1 | 10/2006 | Kimchi et al. |
| 2006/0250515 A1 | 11/2006 | Koseki et al. |
| 2007/0024612 A1 | 2/2007 | Balfour |
| 2007/0046448 A1 | 3/2007 | Smitherman |
| 2007/0237420 A1 | 10/2007 | Steedly et al. |
| 2008/0120031 A1 | 5/2008 | Rosenfeld et al. |
| 2008/0123994 A1 | 5/2008 | Schultz et al. |
| 2008/0273090 A1 * | 11/2008 | Niimura .................. 348/207.99 |

FOREIGN PATENT DOCUMENTS

| | | |
|---|---|---|
| AU | 3874400 | 9/2000 |
| AU | 03/291364 | 6/2004 |
| BR | 0316110 | 9/2005 |
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 0424875 A2 | 10/1990 |
| EP | 1180967 | 2/2002 |
| EP | 1418402 | 5/2004 |

| | | |
|---|---|---|
| EP | 1696204 | 8/2006 |
| ES | 2266704 T | 3/2007 |
| HK | 1088421 A | 11/2006 |
| JP | 2003/317089 A | 11/2003 |
| JP | 2006505794 T | 2/2006 |
| MX | PA05004987 | 2/2006 |
| SG | 2005/03341 | 5/2007 |
| WO | WO99/18732 | 4/1999 |
| WO | WO/00/53090 | 9/2000 |
| WO | WO/2004/044692 | 5/2004 |
| WO | WO/2005/088251 | 9/2005 |
| WO | WO/2008/028040 | 3/2008 |
| WO | WO 2008/081993 A1 | 7/2008 |

OTHER PUBLICATIONS

Ciampa, John A., "Pictometry Digital Video Mapping", SPIE, vol. 2598, pp. 140-148, 1995.
Ciampa, J. A., Oversee, Presented at Reconstruction After Urban earthquakes, Buffalo, NY, 1989.
Dunford et al., Remote Sensing for Rural Development Planning in Africa, The Journal for the International Institute for Aerial Survey and Earth Sciences, 2:99-108, 1983.
Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.
Konecny, G., "Issues of Digital Mapping", Leibniz University Hannover, Germany, GIS Ostrava 2008, Ostrava 27.—Jan. 30, 2008, pp. 1-8.
Konecny, G., "Analytical Aerial Triangulation with Convergent Photography", Department of Surveying Engineering, University of New Brunswick, pp. 37-57, 1966.
Konecny, G., "Interior Orientation and Convergent Photography", Photogrammetric Engineering, pp. 625-634, 1965.
Graham, Lee A., "Airborne Video for Near-Real-Time Vegetation Mapping", Journal of Forestry, 8:28-32, 1993.
Graham, Horita TRG-50 SMPTE Time-Code Reader, Generator, Window Inserter, 1990.
Hess, L.L, et al., "Geocoded Digital Videography for Validation of Land Cover Mapping in the Amazon Basin", International Journal of Remote Sensing, vol. 23, No. 7, pp. 1527-1555, 2002.
Hinthorne, J., et al., "Image Processing in The Grass GIS", Geoscience and Remote Sensing Symposium, 4:2227-2229, 1991.
Imhof, Ralph K., "Mapping from Oblique Photographs", Manual of Photogrammetry, Chapter 18.
Jensen, John R., Introductory Digital Image Processing: A Remote Sensing Perspective, Prentice-Hall, 1986; 399 pages.
Lapine, Lewis A., "Practical Photogrammetric Control by Kinematic GPS", GPS World, 1(3):44-49, 1990.
Lapine, Lewis A., Airborne Kinematic GPS Positioning for Photogrammetry—The Determination of the Camera Exposure Station, Silver Spring, MD, 11 pages, at least as early as 2000.
Linden et al., Airborne Video Automated Processing, US Forest Service Internal report, Fort Collins, CO, 1993.
Myhre, Dick, "Airborne Video System Users Guide", USDA Forest Service, Forest Pest Management Applications Group, published by Management Assistance Corporation of America, 6 pages, 1992.
Myhre et al., "An Airborne Video System Developed Within Forest Pest Management—Status and Activities", 10 pages, 1992.
Myhre et al., "Airborne Videography—A Potential Tool for Resource Managers"—Proceedings: Resource Technology 90, 2nd International Symposium on Advanced Technology in Natural Resource Management, 5 pages, 1990.
Myhre et al., Aerial Photography for Forest Pest Management, Proceedings of Second Forest Service Remote Sensing Applications Conference, Slidell, Louisiana, 153-162, 1988.
Myhre et al., "Airborne Video Technology", Forest Pest Management/Methods Application Group, Fort Collins, CO, pp. 1-6, at least as early as Jul. 30, 2006.
Norton-Griffiths et al., 1982. "Sample surveys from light aircraft combining visual observations and very large scale color photography". University of Arizona Remote Sensing Newsletter 82-2:1-4.

Norton-Griffiths et al., "Aerial Point Sampling for Land Use Surveys", Journal of Biogeography, 15:149-156, 1988.
Novak, Rectification of Digital Imagery, Photogrammetric Engineering and Remote Sensing, 339-344, 1992.
Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.
Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.
Slaymaker, et al., "Cost-effective Determination of Biomass from Aerial Images", Lecture Notes in Computer Science, 1737:67-76, http://portal.acm.org/citation.cfm?id=648004.743267&coll=GUIDE&dl=, 1999.
Slaymaker, et al., "A System for Real-time Generation of Geo-referenced Terrain Models", 4232A-08, SPIE Enabling Technologies for Law Enforcement Boston, MA, ftp://vis-ftp.cs.umass.edu/Papers/schultz/spie2000.pdf, 2000.
Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.
Slaymaker, et al., "Calculating Forest Biomass With Small Format Aerial Photography, Videography and a Profiling Laser", In Proceedings of the 17th Biennial Workshop on Color Photography and Videography in Resource Assessment, Reno, NV, 1999.
Slaymaker et al., Mapping Deciduous Forests in Southern New England using Aerial Videography and Hyperclustered Multi-Temporal Landsat TM Imagery, Department of Forestry and Wildlife Management, University of Massachusetts.
Star et al., "Geographic Information Systems an Introduction", Prentice-Hall, 1990.
Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", MicroImages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. Dec. 12, 2000.
Mostafa, et al., "Airborne Direct Georeferencing of Frame Imagery: An Error Budget", The 3$^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.
Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4.
Artes F., & Hutton, J., "GPS and Inertial Navigation Delivering", Sep. 2005, GEOconnexion International Magazine, p. 52-53.
"POS AV" APPLANIX, Product Outline, airborne@applanix.com, 3 pages.
POSTrack, "Factsheet", APPLANIX, Ontario, Canada, www.applanix.com.
POS AV "Digital Frame Camera Applications", 3001 Inc., Brochure, 2007.
POS AV "Digital Scanner Applications", Earthdata Brochure,.
POS AV "Film Camera Applications" AeroMap Brochure.
POS AV "LIDAR Applications" MD Atlantic Brochure.
POS AV "OEM System Specifications", 2005.
POS AV "Synthetic Aperture Radar Applications", Overview, Orbisat Brochure.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.

McConnel, Proceedings Aerial Pest Detection and Monitoring Workshop—1994.pdf, USDA Forest Service Forest Pest Management, Northern Region, Intermountain regiion, Forest Insects and Diseases, Pacific Northwest Region.
"Standards for Digital Orthophotos", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", Bildmessung und Luftbildwesen, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISP RS Journal of Photogrammetry & Remote Sensing*, 56(1): I-12, Jun. 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer News State & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. in 3D," *Orange County Register* (California), Sep. 27, 2000.
Reyes, "Orange County freezes ambitious aerial photography project," *Los Angeles Times*, Oct. 16, 2000.
International Preliminary Report on Patentability.
Examination Report, Nov. 17, 2010.
English Translation of EP 0 424 875 A2.
International Search Report and Written Opinion, May 23, 2008.
Response to Examination Report dated May 17, 2011.

* cited by examiner

EVENT MULTIPLEXER FOR MANAGING THE CAPTURE OF IMAGES

CROSS-REFERENCE TO RELATED APPLICATIONS

The present patent application claims priority to the provisional patent application identified by U.S. Ser. No. 60/901,444, which was filed on Feb. 15, 2007, the entire content of which is hereby incorporated herein by reference.

STATEMENT REGARDING FEDERALLY SPONSORED RESEARCH AND DEVELOPMENT

Not Applicable.

BACKGROUND OF THE INVENTION

As background, in the remote sensing/aerial imaging industry, imagery is used to capture views of a geographic area and to be able to measure objects and structures within the images as well as to be able to determine geographic locations of points within the image. These are generally referred to as "geo-referenced images" and come in two basic categories:

Captured Imagery—these images have the appearance they were captured by the camera or sensor employed.

Projected Imagery—these images have been processed and converted such that they confirm to a mathematical projection.

All imagery starts as captured imagery, but as most software cannot geo-reference captured imagery, that imagery is then reprocessed to create the projected imagery. The most common form of projected imagery is the ortho-rectified image. This process aligns the image to an orthogonal or rectilinear grid (composed of rectangles). The input image used to create an ortho-rectified image is a nadir image—that is, an image captured with the camera pointing straight down. It is often quite desirable to combine multiple images into a larger composite image such that the image covers a larger geographic area on the ground. The most common form of this composite image is the "ortho-mosaic image" which is an image created from a series of overlapping or adjacent nadir images that are mathematically combined into a single ortho-rectified image.

When creating an ortho-mosaic, this same ortho-rectification process is used, however, instead of using only a single input nadir image, a collection of overlapping or adjacent nadir images are used and they are combined to form a single composite ortho-rectified image known as an ortho-mosaic. In general, the ortho-mosaic process entails the following steps:

A rectilinear grid is created, which results in an ortho-mosaic image where every grid pixel covers the same amount of area on the ground.

The location of each grid pixel is determined from the mathematical definition of the grid. Generally, this means the grid is given an X and Y starting or origin location and an X and Y size for the grid pixels. Thus, the location of any pixel is simply the origin location plus the number of pixels times the size of each pixel. In mathematical terms: $Xpixel = Xorigin + Xsize \times Columnpixel$ and $Ypixel = Yorigin + Ysize \times Rowpixel$.

The available nadir images are checked to see if they cover the same point on the ground as the grid pixel being filled. If so, a mathematical formula is used to determine where that point on the ground projects up onto the camera's pixel image map and that resulting pixel value is then transferred to the grid pixel.

Because the rectilinear grids used for the ortho-mosaic are generally the same grids used for creating maps, the ortho-mosaic images bear a striking similarity to maps and as such, are generally very easy to use from a direction and orientation standpoint.

In producing the geo-referenced aerial images, hardware and software systems designed for georeferencing airborne sensor data exist and are identified herein as a "POS", i.e., a position and orientation system. For example, a system produced by Applanix Corporation of Richmond Hill, Ontario, Canada and sold under the trademark "POS AV" provides a hardware and software system for directly georeferencing sensor data. Direct Georeferencing is the direct measurement of sensor position and orientation (also known as the exterior orientation parameters), without the need for additional ground information over the project area. These parameters allow data from the airborne sensor to be georeferenced to the Earth or local mapping frame. Examples of airborne sensors include: aerial cameras (digital or film-based), multi-spectral or hyper-spectral scanners, SAR, or LIDAR.

The POS system, such as the POS AV system, was mounted on a moving platform, such as an airplane, such that the airborne sensor was pointed toward the Earth. The positioning system received position signals from a satellite constellation and also received time signals from an accurate clock. The sensor was controlled by a computer running flight management software to take images. Signals indicative of the taking of an image were sent from the sensor to the positioning system to record the time and position where the image was taken.

However, the prior POS systems only included one or two ports for recording the time of sensor capture and position of only one or two independent sensors. The industry standard method for solving this problem is to slave one or more cameras to another camera and then to actuate all of the cameras simultaneously. However, this does not permit independent actuation of each of the cameras.

If more than two independent sensors are to be used with the prior positioning system, then a separate system for recording the time and position of sensor capture must be developed. It is to such a system for recording the time of sensor that the present invention is directed.

DETAILED DESCRIPTION OF THE INVENTION

Figure 1:
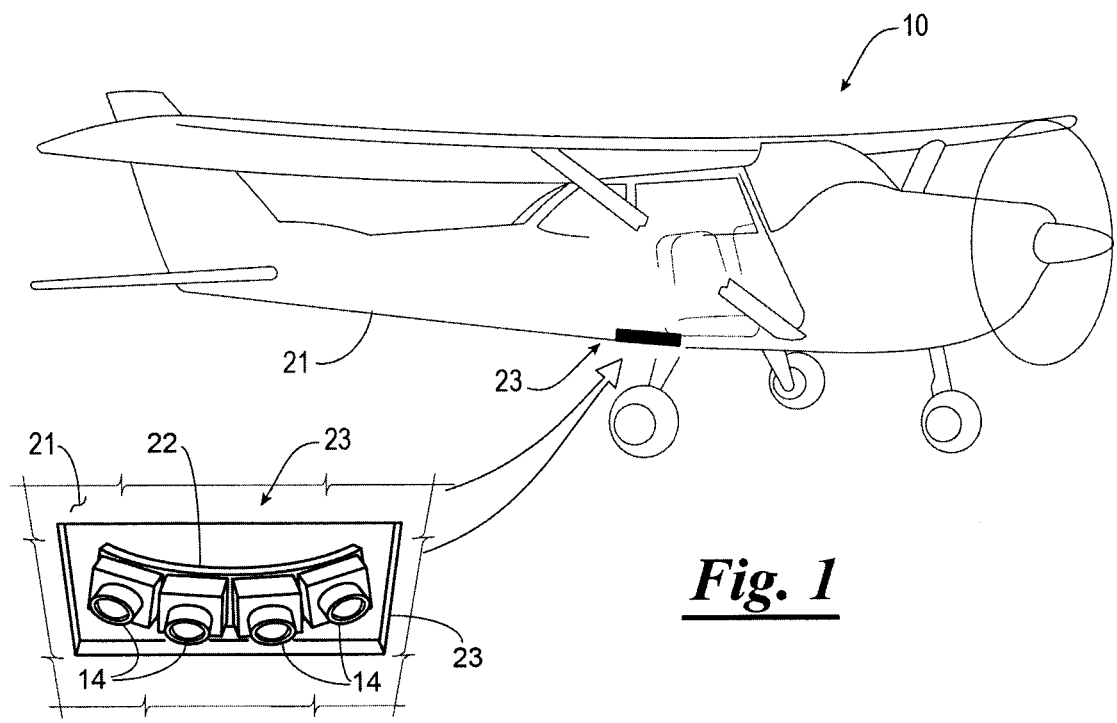
FIG. 1 is a perspective view of an exemplary image capture system constructed in accordance with the present invention.

Before explaining at least one embodiment of the invention in detail, it is to be understood that the invention is not limited in its application to the details of construction, experiments, exemplary data, and/or the arrangement of the components set forth in the following description or illustrated in the drawings. The invention is capable of other embodiments or being practiced or carried out in various ways. Also, it is to be understood that the phraseology and terminology employed herein is for purposes of description and should not be regarded as limiting.

Figure 2:
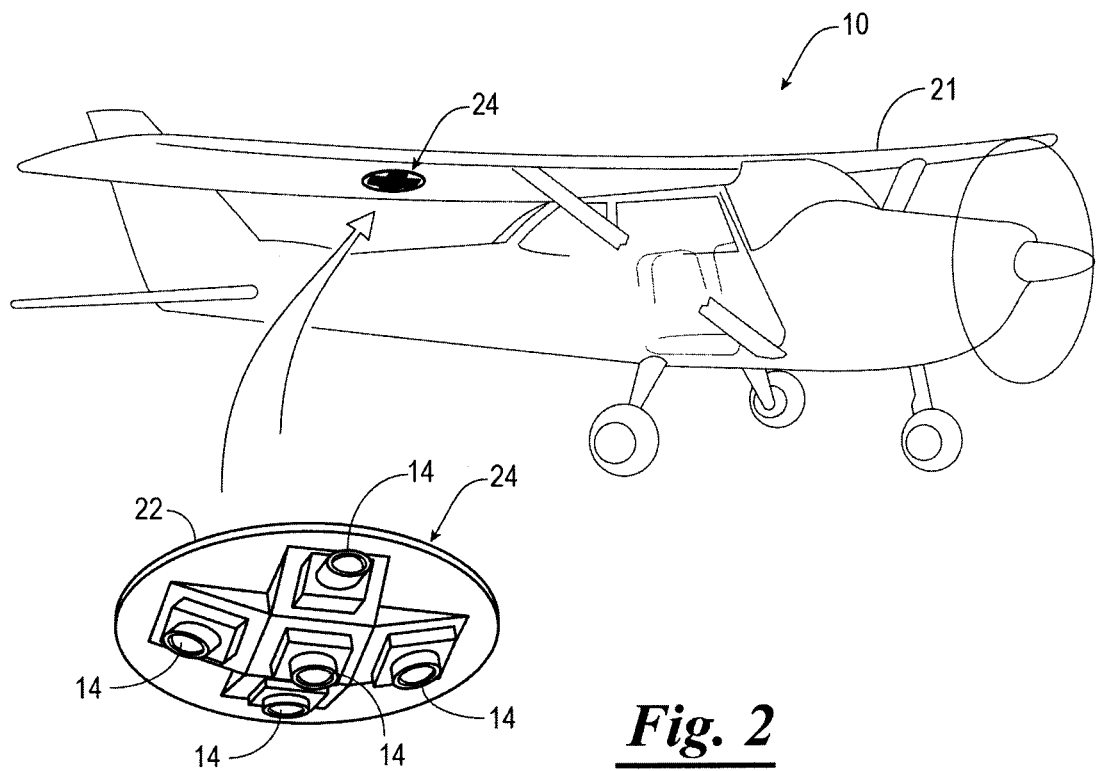
FIG. 2 is a perspective view of another example of an image capture system constructed in accordance with the present invention.
Figure 3:
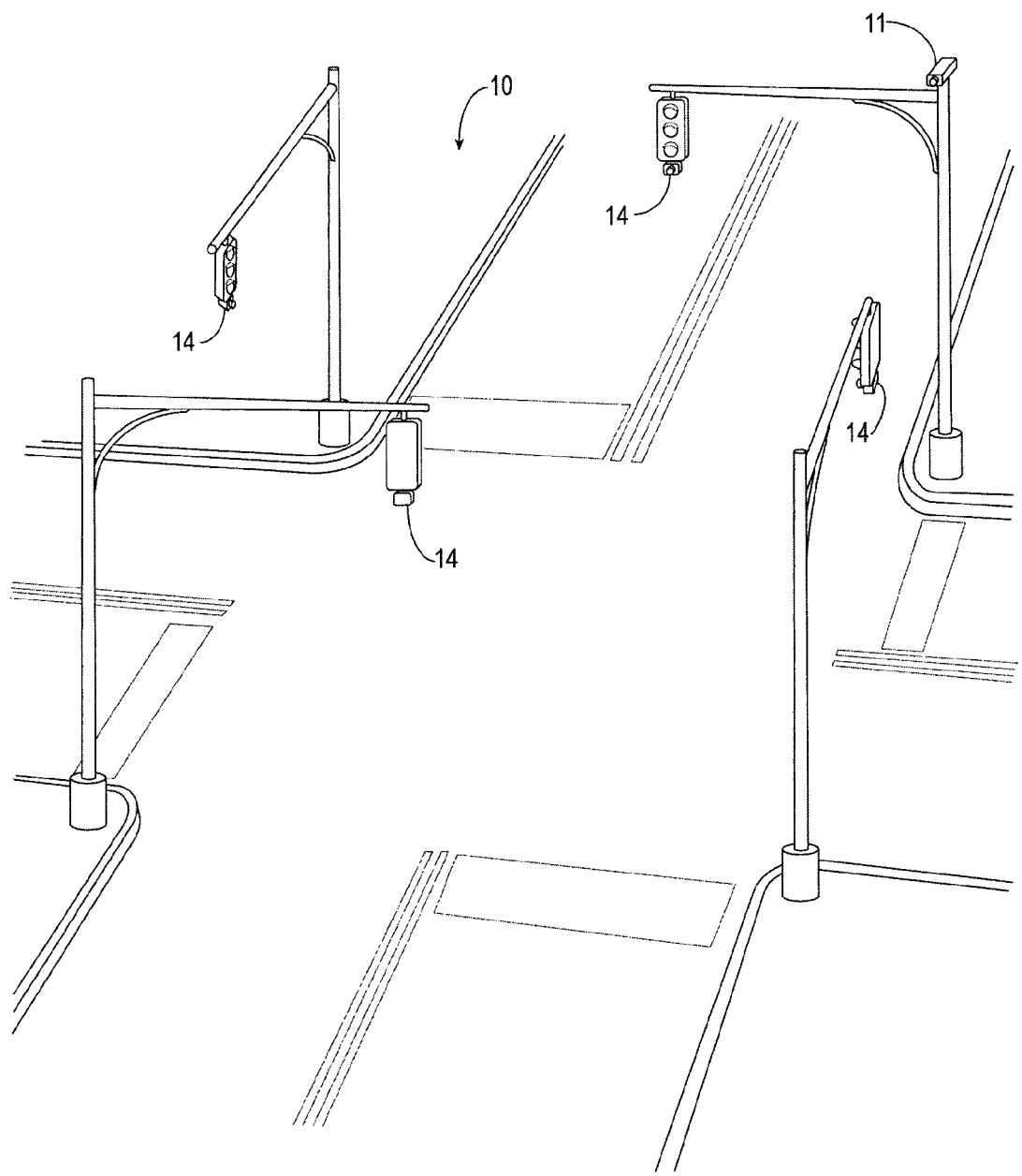
FIG. 3 is a perspective view of yet another example of an image capture system constructed in accordance with the present invention.

Referring to the drawings, and in particular to FIGS. 1, 2 and 3, shown therein and designated by a reference numeral 10 is an image capture system constructed in accordance with the present invention. The image capture system 10 is typically used for capturing aerial images as shown in FIGS. 1 and 2. However, while the image capture system 10 is extremely useful for aerial imaging, it has numerous other applications—such as when a system has more external triggers than inputs on a device that must react to the external triggers. For instance, as shown in FIG. 3, a municipality might have an intersection with a high occurrence of speeding. In this case, the municipality might wish to install a speed monitoring device, such as a radar gun, combined with multiple independently controlled image capture devices 14 to precisely link the time of image capture to the time of radar reading.

The images can be oblique images, orthogonal images, or nadir images, or combinations thereof.

Figure 4:
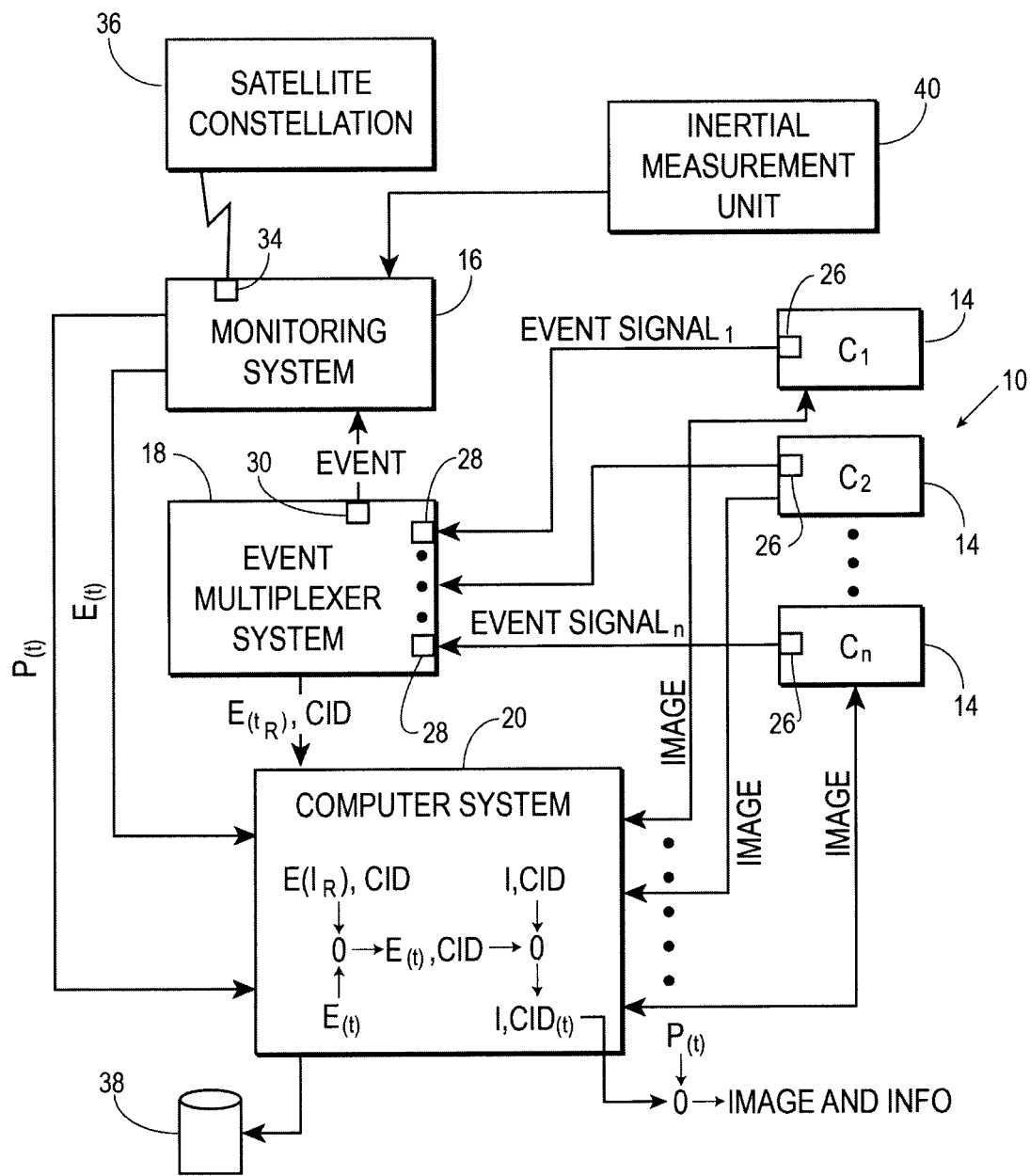
FIG. 4 is a block diagram of the image capture system depicted in FIG. 1.

As shown in FIG. 4, the image capture system 10 is provided with, one or more image capture devices 14, one or more monitoring systems 16, one or more event multiplexer systems 18, and one or more data storage units or computer systems 20. In the examples depicted in FIGS. 1-3 the image capture system 10 is provided with four image capture devices 14 mounted in a sweep pattern (FIG. 1); five image capture devices 14 mounted in a 360 pattern having image capture devices 14 pointing fore, aft, port, starboard and straight down (FIG. 2); four image capture devices 14 mounted in separate directions generally aligned with respective parts of streets (FIG. 3).

In certain embodiments depicted in FIGS. 1 and 2, the image capture devices 14, the one or more monitoring systems 16, the one or more event multiplexer systems 18 and the computer system 20 are mounted to a moving platform 21. The moving platform 21 can be any type of device or system that can move through space in a predetermined, or random manner. Typically, the moving platform 21 is a manned airplane, but it should be understood that the moving platform 21 can be implemented in other manners. For example, the moving platform 21 can be implemented as an unmanned airplane, a train, an automobile such as a van, a boat, a four wheeler, a motor cycle, tractor, a robotic device or the like.

The image capture devices 14 are mounted to the moving platform 21, and once mounted are typically calibrated so that the exact position and orientation of the image capture devices 14 are known with respect to at least a portion of the moving platform 21. For example, as shown in FIGS. 1 and 2, the image capture devices 14 can be mounted onto a common substrate 22 and calibrated with respect to the substrate 22. It should be noted that all of the cables, wires or other signal paths connecting the image capture devices 14, monitoring system 16, event multiplexer 18 and computer system 20 are not shown in FIGS. 1-3 for purposes of clarity. The substrate 22 having the image capture devices 14 mounted thereto is then mounted to the moving platform 21. In the embodiment depicted in FIG. 1, the image capture devices 14 are mounted internally to the moving platform 21 and the moving platform 21 has one or more opening 23 for the image capture devices 14 to sense data through. In other embodiments, one or more of the image capture devices 14 can be mounted externally to the moving platform 21. For example, in FIG. 2 the image capture devices 14 are mounted to an under-wing pod. Alternatively, the image capture devices 14 can be mounted to a roof rack of a car.

Each of the image capture devices 14 has a sensor (not shown) for capturing sensor data, such as an image. Each of the image capture devices 14 is also provided with an event channel 26 providing an event signal indicating the capturing of an image by the sensor. The event channel 26 can be any device that provides a signal coincident with the capturing of the image, such as a flash output. The sensor can capture the image in an analog manner, digital manner, or on film. Further, it should be understood that the image can be stored electronically, optically, or provided on a film-based medium.

The event multiplexer system 18 has at least one image capture input 28 and at least one output port 30. In a preferred embodiment the event multiplexer system 18 has at least two image capture inputs 28. Each image capture input 28 receives signals from the event channel 26 of one of the image capture devices 14. The event multiplexer system 18 outputs event signals indicative of an order of events indicated by the signals provided by the image capture devices 14, and an identification ($C_{ID}$) of image capture devices 14 providing the event signals.

The monitoring system 16 records data indicative of the capturing of the images. For example, the monitoring system 16 can record position data as a function of time, time data and/or orientation data. In the embodiments depicted in FIGS. 1 and 2, the monitoring system 16 records position data as a function of time, as well as time data and/or orientation data related to the moving platform 21. In the embodiment depicted in FIG. 3, the monitoring system 16 records time data. Preferably, the monitoring system 16 automatically and continuously reads and/or records the data. However, it should be understood that the monitoring system 16 can read and/or record the data in other manners, such as on a periodic basis, or upon receipt of a signal to actuate the monitoring system 16 to obtain and record the data. For example, the event signals produced by the event multiplexer system 18 can be provided to the monitoring system 16 to cause the monitoring system 16 to read and/or record the data indicative of position as a function of time related to the moving platform 21.

In the embodiments depicted in FIGS. 1 and 2, the monitoring system 16 also includes a satellite receiver 34 typically receiving position and timing signals from a satellite constellation 36, using any appropriate protocol, such as GPS or loran, although other types of position determining systems can be used, such as cell phone triangulation, e.g., Wireless Application Protocol (WAP).

The computer system 20 receives and stores (preferably in the database 38) the information indicative of the order of events indicated by the event signals, and identification of image capture devices 14 providing the event signals. The computer system 20 optionally also receives and stores the images (preferably in the database 38) generated by the image capture devices 14. The monitoring system 16 records the data indicative of the capturing of images by storing it internally, outputting it to the computer system 20, or outputting such data in any other suitable manner, such as storing such data on an external magnetic or optical storage system. The position related to the moving platform 21 can be provided in any suitable coordinate system, such as an X, Y, Z coordinate system, or a WGS1984 latitude/longitude coordinate system.

Further, the image capture system 10 can be provided with an orientation system, such as an inertial measurement unit 40 for capturing other types of information with respect to the moving platform 21, such as the orientation of the moving platform 21. The inertial measurement unit 40 can be provided with a variety of sensors, such as accelerometers (not shown) for determining the roll, pitch and yaw related to the moving platform 21. Further, it should be understood that the position and/or orientation information does not necessarily have to be a position and/or orientation of the moving platform 21. The position and orientation information is simply related to the moving platform 21, i.e. the position and/or orientation of the moving platform 21 should be able to be determined by the information recorded by the monitoring system 16. For example, the position and orientation information can be provided for a device connected to the moving platform 21. Then, the position and orientation for each image capture device can be determined based upon their known locations relative to the moving platform 21.

Figure 5:
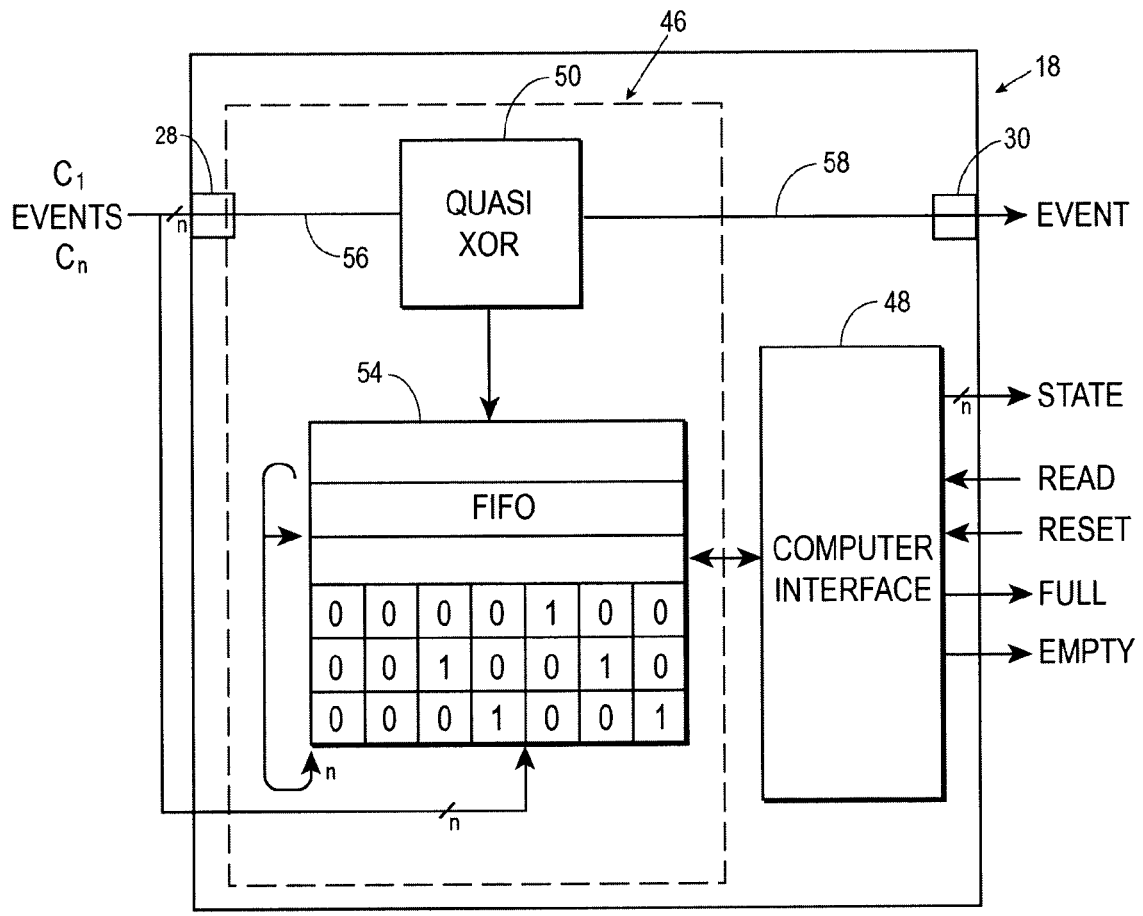
FIG. 5 is a block diagram of one version of an event multiplexer system constructed in accordance with the present invention.

Shown in FIG. 5 is a block diagram of an exemplary event multiplexer system 18 constructed in accordance with the present invention. The event multiplexer system 18 includes an event multiplexer 46 and a computer interface 48. The event multiplexer 46 preferably includes one or more quasi Xor gate 50, and a memory device 54. The quasi Xor gate 50 has a plurality of inputs 56 forming the image capture inputs, and an output 58 forming the at least one output port 30. The memory device 48 receives data from the image capture inputs 28 and also receives an event signal from the quasi Xor gate 50 to record the state of the image capture inputs 28 when the quasi Xor gate 50 determines an event has or is taking place. The memory device 48 can optionally also record the identity of the image capture devices 14 providing the event signals. The quasi Xor gate 50 functions as an exclusive- or gate with the exception that the quasi Xor gate produces an event signal at its output when two or more signals occur simultaneously on the image capture inputs 28.

The memory device 54 can be formed by a first-in-first-out register or any other type of device capable of optionally recording the identity of the image capture device 14 providing the signal, and a sequential order of events based upon the order in which the signals are received.

The computer interface 48 is connected to the memory device 54 to permit the computer system 20 to read the data in the memory device 54. The computer interface 48 can be a device capable of reading the information from the memory device 54 and providing same to the computer system 20. For example, the computer interface 48 can be a serial port, parallel port or a USB port.

Figure 6:
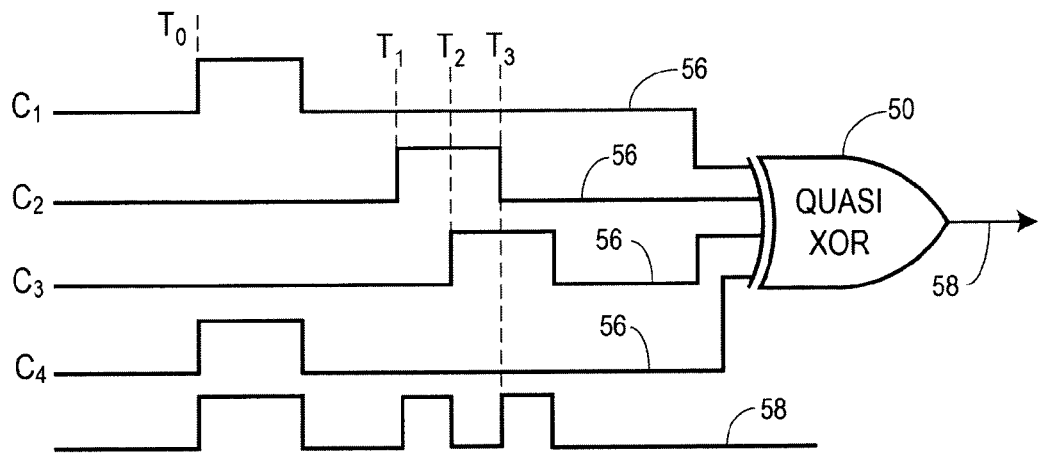
FIG. 6 is a diagrammatic view of a timing/logic flow of an event multiplexer constructed in accordance with the present invention.

For example, FIG. 6 illustrates a diagrammatic view of a timing/logic flow of the event multiplexer 46. In this example, four image capture devices 14 (indicated as $C_1$, $C_2$, $C_3$ and $C_4$ for purposes of clarity) are connected to the Quasi Xor gate 50. The image capture devices $C_1$ and $C_4$ provide a signal simultaneously at time $T_0$; the image capture device $C_2$ provides a signal at $T_1$, and the image capture device $C_3$ provides a signal at $T_2$. The quasi Xor gate 50 outputs an event signal at time $T_0$ on the port 30 because the signals provided by the image capture devices $C_1$ and $C_4$ have a simultaneous leading edge. The quasi Xor gate 50 also outputs an event signal at time $T_1$ based on the signal received from the image capture device $C_2$. Although the quasi Xor gate 50 received the signal from the image capture device $C_3$ at time $T_2$, the quasi Xor gate 50 delays providing an event signal until the lagging edge of the signal provided by the image capture device $C_2$. The quasi Xor gate 50 can be constructed using any suitable logic device(s) capable of providing the functions described above. For example, the quasi Xor gate 50 can be constructed using a microprocessor, digital signal processor, microcontroller, field programmable gate array or a combination of logic gates.

Figure 7:
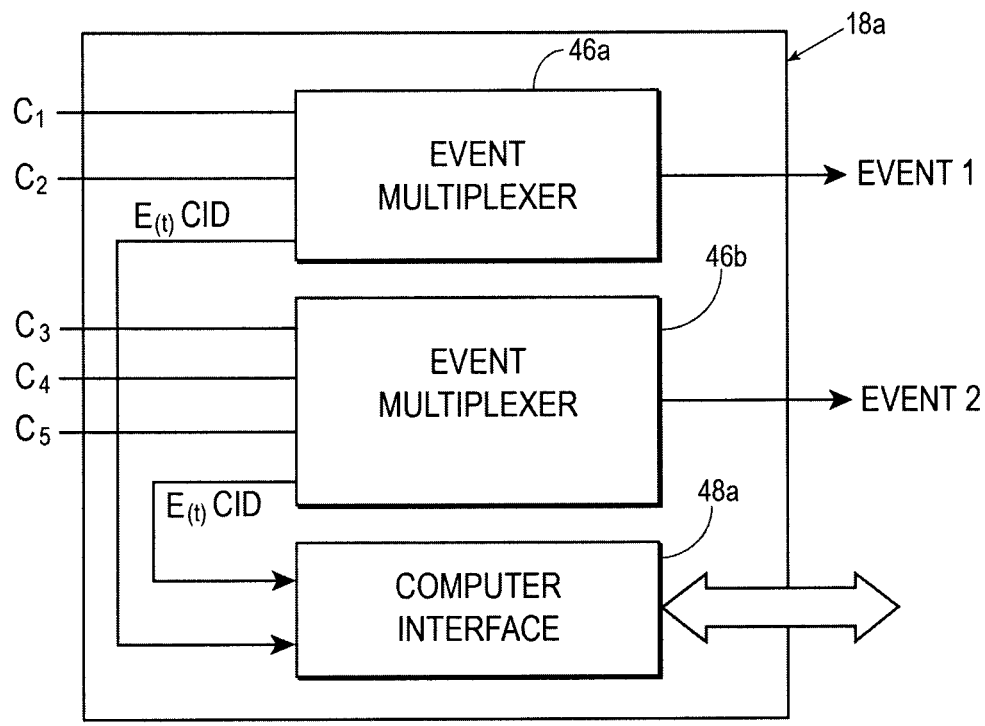
FIG. 7 is a block diagram of another version of an event multiplexer system constructed in accordance with the present invention.

Shown in FIG. 7 is a block diagram of another version of an event multiplexer system 18a constructed in accordance with the present invention. The event multiplexer system 18a is similar in construction and function to the event multiplexer system depicted in FIG. 5 and described above, with the exception that the event multiplexer system 18a includes at least two event multiplexers 46a and 46b (designated by reference numerals X and Y) and a computer interface 48a. The computer interface 48a and the event multiplexers 46a and 46b can be constructed in a similar manner as the computer interface 48 and event multiplexer 46 described above. The event multiplexer 46a receives signals from the event channels of a subset of the image capture devices (in this case image capture devices designated by $C_1$ and $C_2$), and the event multiplexer 46b receives signals from the event channels of a different subset of the image capture devices (in this case image capture devices designated by $C_3$, $C_4$ and $C_5$). Thus, the image capture devices $C_1$-$C_5$, for example, can be divided into a variety of different subsets having different numbers of image capture devices $C_1$-$C_5$. For example, image capture devices $C_1$-$C_3$ can be connected to the event multiplexer 46a and the image capture devices $C_4$-$C_5$ can be connected to the event multiplexer 46b Each of the event multiplexers 46a and 46b provide event signals indicative of an order of events based upon the respective signals received from the image capture devices $C_1$-$C_5$. The event signals provided by the event multiplexers 46a and 46b can be provided to different ports of the monitoring system 16, or to different monitoring systems for causing the monitoring system(s) 16 to read and/or record the data indicative of the position as a function of time related to the moving platform 21.

The computer interface 48a communicates with the event multiplexers 46a and 46b to permit the computer system 20 to read the data from the memory devices and store it on a computer readable medium accessible by the computer system 20. The computer interface 48a can be a device capable of reading the information from the memory device(s) and providing same to the computer system 20. For example, the computer interface 48a can be a serial port, parallel port or a USB port.

Figure 8:
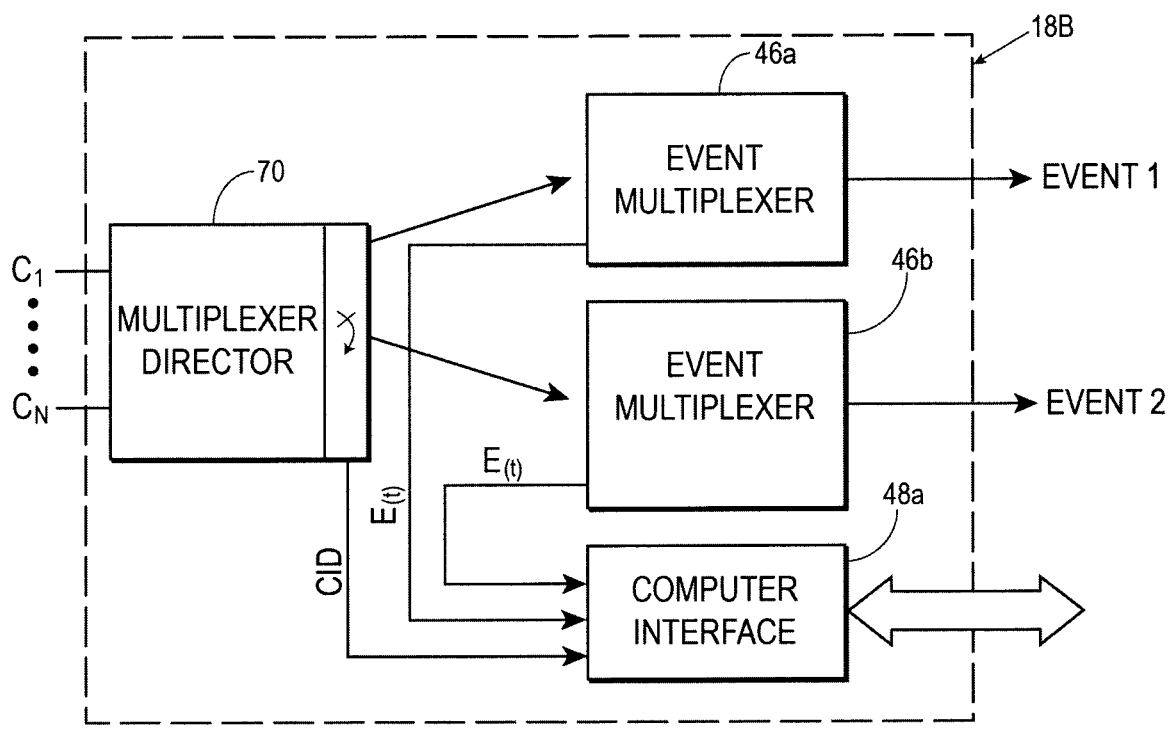
FIG. 8 is a block diagram of yet another version of an event multiplexer system constructed in accordance with the present invention.

Shown in FIG. 8 is a block diagram of another version of an event multiplexer system 18b constructed in accordance with the present invention. The event multiplexer system 18b is similar in construction and function to the event multiplexer system depicted in FIG. 7 and described above, with the exception that the event multiplexer system 18b includes a multiplexer director 70 receiving signals from the event channels from all or a subset of the image capture devices $C_1$-Cn and directing each signals to one or more of at least two event multiplexers (designated by reference numerals 46a and 46b). The multiplexer director 70 provides an image capture device identification signal $C_{ID}$ to the computer interface 48*a* for passing on to the computer system 20. The event multiplexers 46*a* and 46*b* receive the signals from the multiplexer director, 70 and in response thereto, provide event signals to the monitoring system 20.

The computer interface 48*a* and the event multiplexers 46*a* and 46*b* can be constructed in a similar manner as the computer interface 48 and event multiplexer 46 described above. Each of the event multiplexers 46*a* and 46*b* provide event signals indicative of an order of events based upon the respective signals received from the image capture devices $C_1$-$C_5$ via the multiplexer director 70. The event signals provided by the event multiplexers 46*a* and 46*b* can be provided to different ports of the monitoring system 16, or to different monitoring systems 16 for causing the monitoring system(s) 16 to read and/or record the data indicative of the position as a function of time related to the moving platform 21.

The computer interface 48*a* communicates with the event multiplexers 46*a* and 46*b* to permit the computer system 20 to read the data indicative of the order of events E(t) from the respective memory devices and store such data E(t) on a computer readable medium accessible by the computer system 20.

Figure 9:
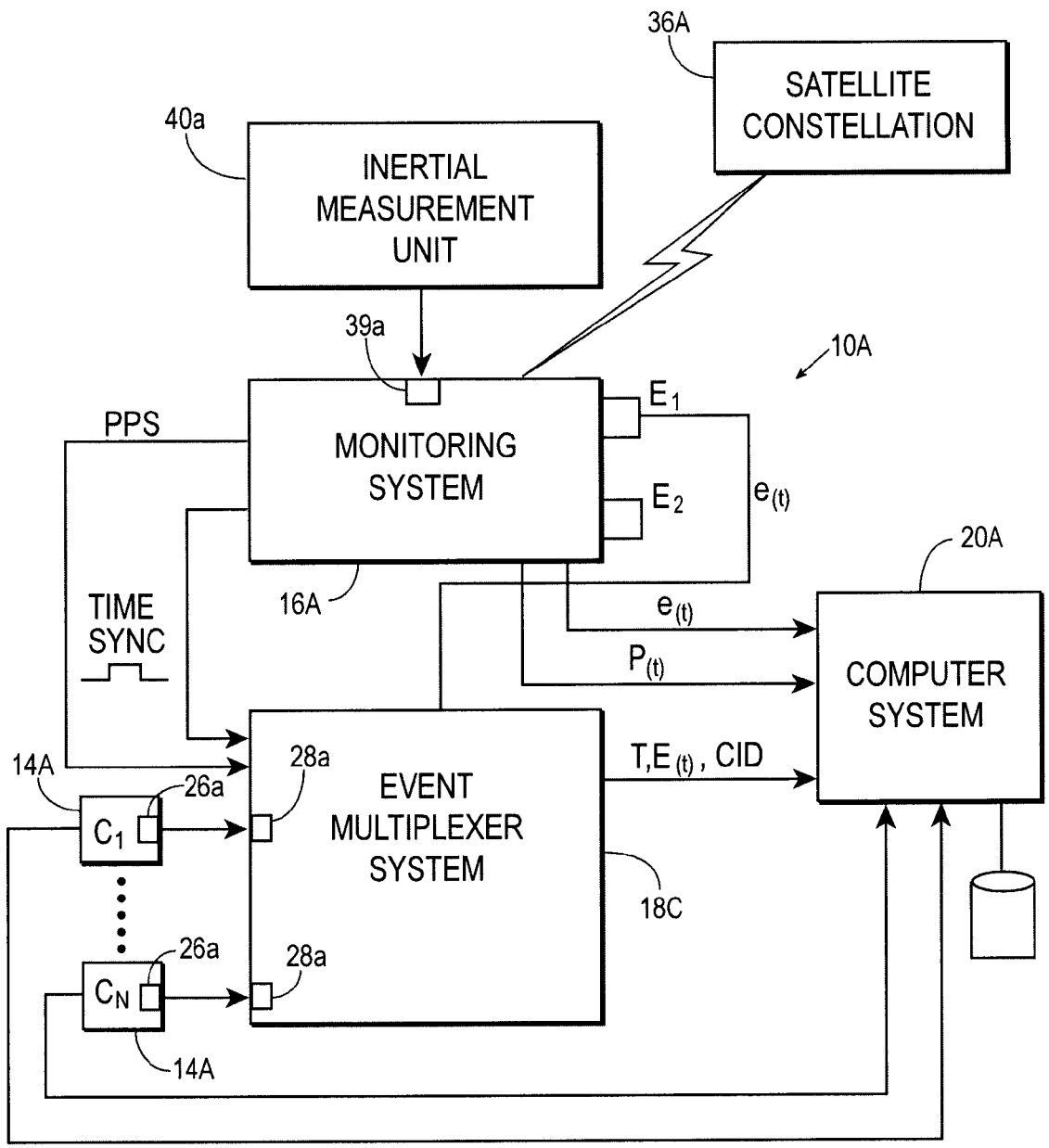
FIG. 9 is a block diagram of another version of an image capture system constructed in accordance with the present invention.

Shown in FIG. 9 and designated by a reference numeral 10*a* is a block diagram of another image capture system constructed in accordance with the present invention. The image capture system 10*a* is similar to the image capture system 10 except as described below. In the image capture system 10 (FIG. 4), the event multiplexer system 18, 18*a* or 18*b* records the order of the signals from the image capture devices 14 (relative timing) correlated with an identification of the image capture device 14 producing the signal. The monitoring system 16 records an absolute timing of events that is then correlated to the relative timing. In the image capture system 10*a*, an event multiplexer system 18*c* receives a time sync signal T from an external device such as the monitoring system 16*a* and records the signals from the image capture devices 14 as a function of time and typically an identification of the image capture device 14 producing the signal. The computer system 20*a* receives the signals, T, E(t), and CID and correlates position as a function of time information P(t) recorded by the monitoring system 16A.

Thus, the event multiplexer systems 18, 18*a*, and 18*b* record order of event and optionally record identification of camera information. The event multiplexer systems 18, 18*a* and 18*b* utilize an external timing device (i.e., the monitoring system 16 or the computer system 20) to correlate event with time and thus location. The event multiplexer system 18*c*, receives and records absolute time in addition to the order of events and identification of image capture devices 14. Thus, "order of event" could include relative or absolute time.

The image capture system 10*a* is provided with one or more image capture devices 14*a*, one or more monitoring systems 16*a*, one or more event multiplexer systems 18*c*, and one or more computer systems 20*a* and one or more inertial measurement unit 40*a*.

The image capture devices 14*a*, the monitoring system 16*a* and inertial measurement unit 40*a* are similar in construction and function as the image capture devices 14, monitoring system 16 and inertial measurement unit 40 described above.

The event multiplexer system 18*c* is similar in construction and function as the event multiplexer system 18, 18*a* and 18*b* described above, with the exception that the event multiplexer system 18*c* receives absolute time signals, such as a (PPS) and time sync signal from the monitoring system 16*a* (or a separate time receiver) and records the absolute time each instance in which a signal is received from one of the image capture devices 14*a*. The time signal is preferably an accurate signal received from a satellite constellation or an atomic clock. In addition, the absolute time of each event (T, E(t)), and an identification of the image capture device 14*a* for each event ($C_{ID}$) is passed to the computer system 20*a*.

The monitoring system 16*a* passes signals to the computer system 20*a* indicative of the position of the moving platform 21 as a function of time, and the image capture devices 14*a* pass the captured images to the computer system 20*a*. Thus, the computer system 20*a* is provided with and stores the information for correlating the data indicative of position as a function of time with particular captured images.

The event multiplexer system 18*c* can also optionally provide event signals e(t) to the monitoring system 16*a* in a similar manner as the event multiplexer systems 18, 18*a* and 18*b* described above, for purposes of redundancy, and/or verification of the data. The event signals e(t) can also optionally be provided to the computer system 20*a* from the monitoring system 16*a* and in this instance the computer system 20*a* optionally compares e(t) with E(t) for calibration, diagnostic or feedback purposes to make sure that the time sync signal is correct.

In using the systems depicted in FIGS. 1 and 2, the image capture devices 14 or 14*a* are mounted on the moving platform 21, such as an airplane, such that image capture devices 14 or 14*a* are pointed toward an object, such as the Earth. The moving platform 21 is then actuated to move, and the image capture devices 14 or 14*a* capture images at pre-determined or random times or positions. Typically, the image capture devices 14 or 14*a* will be independently controlled by flight management software running on the computer system 20 or 20*a* and the taking of the images will be pre-determined. In any event, as the image capture devices 14 or 14*a* capture the images, signals are passed to the event multiplexers systems 18, 18*a*, 18*b* or 18*c* and the order of events (relative or absolute), image capture device identification and the position as a function of time data is logged and stored by the cooperation of the event multiplexer systems 18, 18*a*, 18*b* and 18*c*, monitoring systems 16 or 16*a* and computer systems 20 or 20*a* as described above. Then, the images are geo-referenced as described in the Background of the Invention section above utilizing the recorded data regarding the order of events (relative or absolute), image capture device identification and the position as a function of time data.

In using the system depicted in FIG. 3, the image capture devices 14 or 14*a* are mounted adjacent to the intersection. For example, the image capture devices 14 or 14*a* can be mounted to separate traffic light poles such that the image capture devices 14 or 14*a* are pointed at the streets entering or leaving the intersection. The system depicted in FIG. 3 also includes a radar gun pointing at the intersection to sense the speed of cars moving through the intersection. When a car speeds through the intersection, one or more of the image capture devices 14 or 14*a* can be actuated (preferably by a computer controlled management system) to preferably take a picture of the driver and tag of the car, while the event multiplexer systems 18, 18*a*, 18*b* or 18*c* capture data such as time data correlated with the data produced by the radar gun. This precisely links the time of image capture (or other sensor data) to the time of radar reading to provide evidence of the identity of the speeding car and driver in this example.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. An image capture system for capturing images of an object, the image capture system comprising:
   a moving platform;
   at least three image capture devices mounted to the moving platform, each image capture device having a sensor for capturing an image and an event channel providing an event signal indicating the capturing of an image by the sensor;
   a monitoring system recording data indicative of a position and orientation as a function of time related to the moving platform, the monitoring system having fewer input ports for initiating the recording of the data indicative of the position and orientation as a function of time than the at least three image capture devices;
   an event multiplexer multiplexing at least three image capture inputs to at least one output port, the event multiplexer having more image capture inputs than the input ports of the monitoring system, wherein the event channels of the at least three image capture devices are connected to the at least three image capture inputs, the event multiplexer outputting information from the image capture devices through the at least one output port to the monitoring system for correlating the data indicative of position and orientation as a function of time with particular captured images; and
   a computer system independently controlling the at least three image capture devices and receiving and storing the information.

2. The image capture system of claim 1, wherein the information stored by the computer system includes a sequential order of events based upon the order in which the event signals are received by the event multiplexer.

3. The image capture system of claim 1, wherein the event multiplexer comprises a first-in-first out-register storing the event signals.

4. The image capture system of claim 1, wherein the event multiplexer comprises a quasi-X or gate having inputs forming the image capture inputs, and an output forming one of the at least one output port.

5. The image capture system of claim 1, wherein the monitoring system includes an input port receiving event signals from the output port of the event multiplexer, and wherein the monitoring system records data indicative of the time at which the event signal was received.

6. The image capture system of claim 5, wherein the computer system stores the data indicative of the time at which the event signal was received by the monitoring system and a camera ID identifying the image capture device from which the event signal was received.

7. The image capture system of claim 1, wherein the information output by the event multiplexer includes absolute time data.

8. The image capture system of claim 1, wherein the information output by the event multiplexer includes relative time data.

9. The image capture system of claim 1, wherein the computer system correlates the information indicative of the order of events indicated by the event signals, and identification of image capture devices providing the event signals to identify particular captured images.

10. The image capture system of claim 1, wherein the at least three image capture devices are mounted to a common substrate.

11. The image capture system of claim 1, wherein the at least three image capture devices include at least five image capture devices mounted to point fore, aft, port, starboard and straight down.

* * * * *